Feb. 20, 1968   P. BOONE   3,370,111
PROCESS AND APPARATUS FOR MAKING SHEET MATERIAL HAVING
A VARYING MOLECULAR ORIENTATION
Filed June 17, 1964    3 Sheets-Sheet 1

INVENTOR.
Philip Boone
BY
Brown and Mikulka
ATTORNEYS

Feb. 20, 1968 P. BOONE 3,370,111
PROCESS AND APPARATUS FOR MAKING SHEET MATERIAL HAVING
A VARYING MOLECULAR ORIENTATION
Filed June 17, 1964 3 Sheets-Sheet 3

INVENTOR.
Philip Boone
BY
Brown and Mikulka
ATTORNEYS

United States Patent Office 3,370,111
Patented Feb. 20, 1968

3,370,111
PROCESS AND APPARATUS FOR MAKING SHEET MATERIAL HAVING A VARYING MOLECULAR ORIENTATION
Philip Boone, Winchester, Mass., assignor to Polaroid Corporation, Cambridge, Mass., a corporation of Delaware
Filed June 17, 1964, Ser. No. 375,853
7 Claims. (Cl. 264—2)

This invention relates to a process and apparatus for providing given patterns of differential or varying molecular orientation in a plastic sheet material and, more particularly, to provide such patterns automatically and continuously.

An object of the invention is to provide a method and apparatus adapted to produce in large quantities, automatically and continuously, through sequential applications of controlled varying tensioning forces, a sheet material having a molecular orientation disposed in a plurality of given directions. Another object is to provide sheet materials of the character described which are doubly refracting and which include optic axes arranged in various predetermined directions. Assuming the sheet material to include means contributing to render it light polarizing, another object of the invention is to provide a method and apparatus adapted to produce, automatically and continuously, a light polarizer, e.g., a linear polarizer, having a continuously varying direction of polarization, the terms "polarizing direction," "vibration direction" and "electric vector" being used in a similar sense herein and the term "optically anisotropic" referring to either birefringent or polarizing materials. Other objects are to provide a process and apparatus of the nature described capable of producing oriented optically anisotropic and highly transparent sheet materials in which directional changes of orientation or axes are entirely gradual so that when viewed in axially changing polarized light, no undesirable lines of demarcation between the areas of differing orientation, in terms of light absorption or transmission, exist; and to provide a process and apparatus, as described, adapted to the treatment of sheet materials of the type of a high-molecular-weight hydroxyl-containing vinyl polymer such, for example, as polyvinyl alcohol into which is imbibed a dichroic stain or a dichroic direct cotton dye, continuous lengths of the sheet materials being laminated to dimensionally stable supporting materials and cut into preferred shapes such as panels or strips, according to intended usage.

Other objects of the invention will in part by obvious and will in part appear hereinafter.

The invention accordingly comprises the process involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The process and apparatus of the present invention are related to those of U.S. Patent No. 2,505,146, in which is described the continuous stretching of a sheet material in a direction, other than longitudinally of the direction in which it is advanced, and, more exactly, at a given acute angle relative to its long dimension. However, whereas the referenced process and apparatus are devoted strictly to the production of a constant linear molecular orientation throughout the sheet material, the present invention is pointed toward producing a controlled or predetermined varying orientation in different areas of a sheet material and, more particularly, curved orientations of given arcual characteristics.

As set forth in the aforementioned patent, it is possible to advance a continuous length of a stretchable and molecularly orientatable plastic sheet material along a given path and at a given speed toward a linear discharge area extending transversely across the sheet material, as by carrying the sheet material between adjacent, similarly-moving and frictionally-contacting, compressive surfaces of a pair of powered endless belts; to soften the sheet material in a transverse band-like area immediately adjacent to the aforesaid discharge area, as by an application of heat, to render the sheet material adapted to stretching; and to draw the sheet material, under tension and against the restrictive transversely-applied compressive force immediately preceding the aforesaid discharge area, from the softening area in a direction which is different from, and at a speed which exceeds that at which it is introduced to this area. The method, as described, effects a tensioning of the sheet material and causes it to undergo stretching and a linear molecular orientation at a given acute angle relative to the longitudinal dimension of the material. With an understanding of the foregoing method, the modified procedure and function of the apparatus of the present invention will be apparent.

Figure 1:
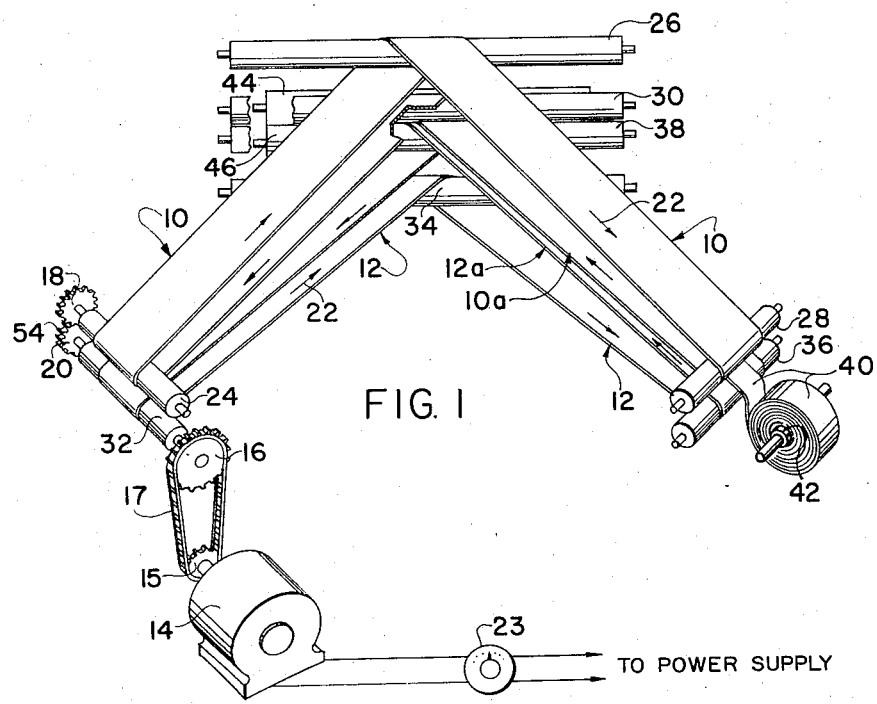
FIGURE 1 is a diagrammatic, perspective, rear view of apparatus of the invention.

Referring now to FIGURE 1, a basic and somewhat simplified apparatus of the type contemplated is shown from the rear or input side. Two endless belts 10 and 12 composed of a suitably flexible and heat-resistant material are driven at a uniform given speed by an electric motor 14, the sprockets 15 and 16, the drive chain 17, and the pinion gears 18 and 20, in the directions indicated by the arrows 22. The motor is provided with speed control means 23. The endless belt 10 passes, in order, around the drive roll 24, the guide roll 26, the idler roll 28 and thence around one of the input pressure rolls 30 and back to the drive roll 24. The other endless belt 12 passes, respectively, around the drive roll 32, the guide roll 34, the idler roll 36, the other input pressure roll 38, and back to the drive roll 32. Mounting means for supporting both the input and output rolls and the film moving mechanism have been omitted, as obscuring the more important portions.

The guide rolls 26 and 34 and the input pressure rolls 30 and 38 may or may not be rotatably mounted. If they are not thus mounted, their surfaces are to be regarded as so highly polished as to permit the driven belts to slip therearound. The idler rolls 28 and 36, although shown as spaced quite widely apart for illustrative purposes, are to be understood as actually having their peripheries closely adjacent to or, if having resilient surfaces, touching one another so that mutually facing surfaces of belt portions 10a and 12a are contiguous as they move together toward the input pressure rolls 30 and 38. A supply of a long strip or continuous length of a plastic sheet or film material 40, e.g., a film of polyvinyl alcohol, cellulose acetate or other molecularly orientatable film material, is carried on a supply spool 42 incorporating suitable frictional braking means.

The uncoiled film 40 is carried between the moving belt portions 10a and 12a toward the input pressure rolls 30 and 38, at a given acute angle to the axes of the latter, and is compressed along a transverse narrow band as the aforesaid belt portions 10a and 12a pass between the input pressure rolls, the transverse band of compression being determined by the bite of the latter rolls. Although the endless belts pass around the input pressure rolls 30 and 38, the film material 40 is discharged therebetween and is almost immediately gripped by the output advancement pressure rolls 44 and 46 which are spaced a slight distance beyond the input rolls. The output advancement pressure rolls 44 and 46 rotate together at a speed which predominantly exceeds that of the input pressure rolls and which is controlled by means described below.

Figure 2:
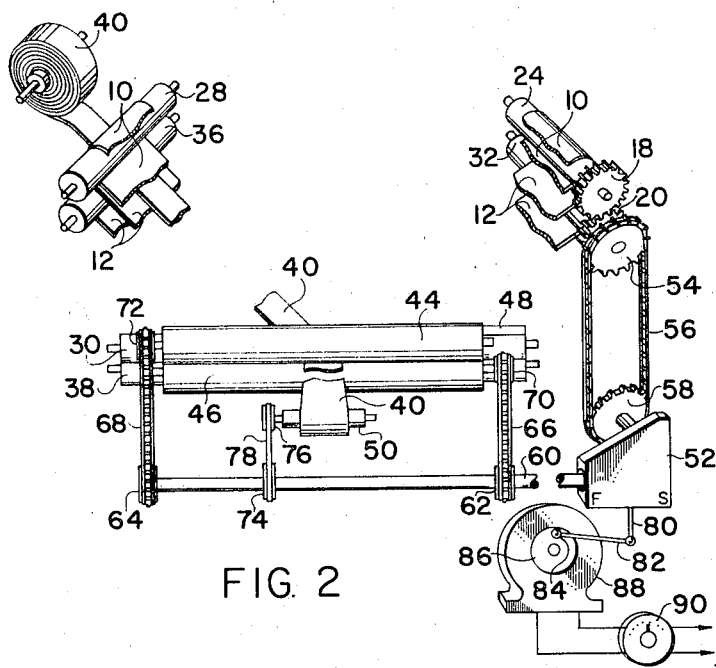
FIG. 2 is a diagrammatic, perspective, front view of the apparatus of FIGURE 1 including additional film tensioning elements.
Figure 6:
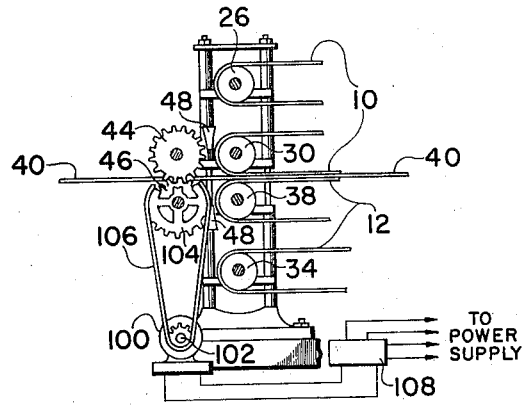
FIGS. 6, 7 and 8 are diagrammatic views of modifications of film tensioning elements of the apparatus of FIG. 2.

As shown in FIGS. 2 and 6, the film material 40 is subjected to heat by heater elements 48 as it passes across the small gap existing between the pair of input pressure rolls 30 and 38 and the pair of output advancement pressure rolls 44 and 46 to soften it and render it adapted to deformation or stretching. The film 40, having undergone stretching and molecular orientation, is discharged from the output advancement pressure rolls 44 and 46 and is taken up on the spool 50, the latter including suitable frictional take-up means, not shown.

A continuously-variable speed control device 52, interconnected with the pair of input drive rolls 24 and 32 and the pair of output advancement pressure rolls 44 and 46, the device 52 being of any appropriate conventional form, as, for example, one including a planetary transmission, or tapered spindles providing frictional driving means of differential diameter, and the like, is employed in conjunction with actuating means to continuously vary the relative speed of input and output film advancing means and, accordingly, to continuously vary the direction of stretch or applied tension and molecular orientation of the film.

The input to the variable speed device 52 is derived from the motor 14 through the intermediary of the drive roller 32, the sprocket 54, the chain drive 56, and the sprocket 58. The output of the device 52 drives the output advancement pressure rolls 44 and 46 by means of the jack shaft 60, the sprockets 62 and 64, the chain drives 66 and 68, and the sprockets 70 and 72 which are fixed to the stub shafts of the output pressure rolls. The take-up means 50 is driven from the jack shaft 60 by means of the pulleys 74 and 76 and the V belt 78. The variable speed device 52 includes a control lever 80, connected by the driving shaft 82 to an eccentric connecting or bearing means 84 on the flywheel 86 of an electric motor 88. The relatively faster and slower outputs of the variable speed device are, respectively, in accordance with movement of the lever 80 toward the F index or toward the S index. The speed of the motor 88 is set manually at any given desired speed by the rheostat control 90 or the latter may, in turn, be a powered device to provide variable speeds of the motor 88. It is to be understood that all motors described herein include suitable gearing to facilitate the necessary low speeds and power requirements.

Figure 3:
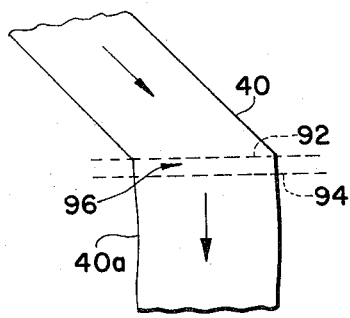
FIG. 3 is a diagrammatic plan view of a fragment of a film material undergoing applied tension and molecular orientation.

In FIG. 3, the advancement of the film material 40 between the input and output compressive zones and the relatively different directions of film movement are shown diagrammatically, a slight waviness of the film edges at 40a being noted after discharge from the compressive zones. The dotted line 92 indicates the transverse band of compression applied by the input pressure rolls 30 and 38 and the dotted line 94 indicates that applied by the output pressure rolls 44 and 46. The zone of softening and stretch 96 lies between the compression bands.

Figure 5:
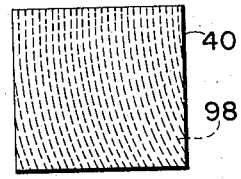
FIGS. 4 and 5 are fragmentary plan views of film material illustrating examples of molecular orientation which can be provided therein.
Figure 4:
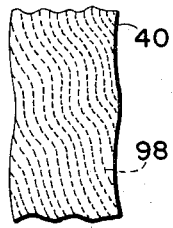

FIG. 4 represents a section of the film material 40 illustrating, by broken lines 98, a typical example of a generally arcual molecular orientation obtained within the film upon discharge from the output pressure rolls due to operation of the continuously variable speed devices described with respect to FIG. 2. FIG. 5 represents a subsection of the film material in the form of a panel which encompasses but one single continuous change of the orientation axis. When rotational speed of the output pressure rolls 44 and 46 is increased relative to the speed of the input drive rolls 24 and 32, the tensioning force applied to the film material of course increases, and vice versa. The pattern of FIG. 4 may be considered as produced by advancing the film from the softening zone at rates which progressively vary from a rate similar to that of the advancement of the film toward said zone to a rate which is appreciably greater, the variation of rate being repeated infinitely.

An increase in the applied tension, as provided by apparatus of the character described, contributes to an increasingly transverse molecular orientation within the film material, that is, one which is at an increasingly greater acute angle with respect to the long dimension of the film and to the direction of its discharge from the output pressure rolls 44 and 46. A decrease in the applied tension lessens this angle. Accordingly, alternate increases and decreases of such tension provide a continuously varying molecular orientation array such as that shown in FIG. 4, wherein the applied tensions produce orientations between 0° and one approaching 90° to the longitudinal dimension of the film. The frequency of the movement of lever 80, back and forth, determines the arcual magnitude of the molecular configurations of FIG. 4. After providing the intended molecular orientation of the film material, it may be laminated to a dimensionally stable support to maintain its molecular orientation. Assuming the material to have been treated to render it light polarizing, the absorption axis may, in general, be taken as parallel to the molecular configurations described.

Figure 7:
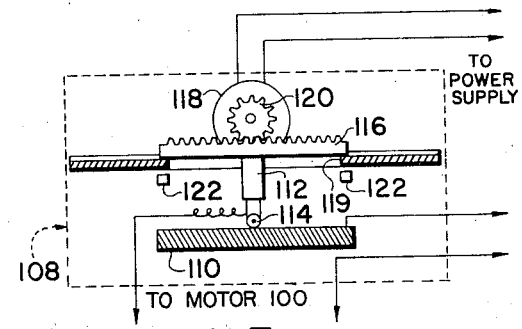

FIGS. 6 and 7 illustrate a device for continuously varying the rotational speed of the output pressure rolls 44 and 46 without variation of the speed at which the film is introduced to the input pressure rolls 30 and 38. Assuming the film material to be introduced at a fixed speed, as by a control similar to the rheostat 23 of FIGURE 1, the output pressure rolls 44 and 46 are driven by the electric motor 100 through the medium of sprockets 102 and 104 and the drive chain 106. The rotational speed of the motor 100 is controlled by the variable resistance device 108.

The device 108 includes a fixed electrical resistance element 110; a movable contact arm 112 including the electrical contact 114, the arm being integral with the slidable rack 116; the fixedly mounted automatically reversible motor 118 with driving pinion 120; and the limit stops 122. The rack 116 is slidably mounted on the track 117, the arm 112 extending through a slot 119 formed in the track. The motor 118 is of a type which automatically undergoes reversal when it is held against rotation, such as occurs when the arm 112 contacts either of the limit stops 122. Movement of the contact 114 across the resistance 110 varies the rotational speed of the motor 100 and, accordingly, that of the output pressure rolls 44 and 46 relative to a predetermined fixed speed of the input belts 10 and 12 to produce a pattern of molecular orientation generally similar to that of FIG. 4. While no means is shown for varying the rotational speed of the motor 118, it will be understood that, in general, its speed controls the frequency and arcual magnitude of the configurations in FIG. 4. It is also to be understood that a variable speed control may also be employed in conjunction with the motor 118 to control or even vary its speed and to provide further modifications of the pattern of molecular orientation within the film material.

Figure 8:
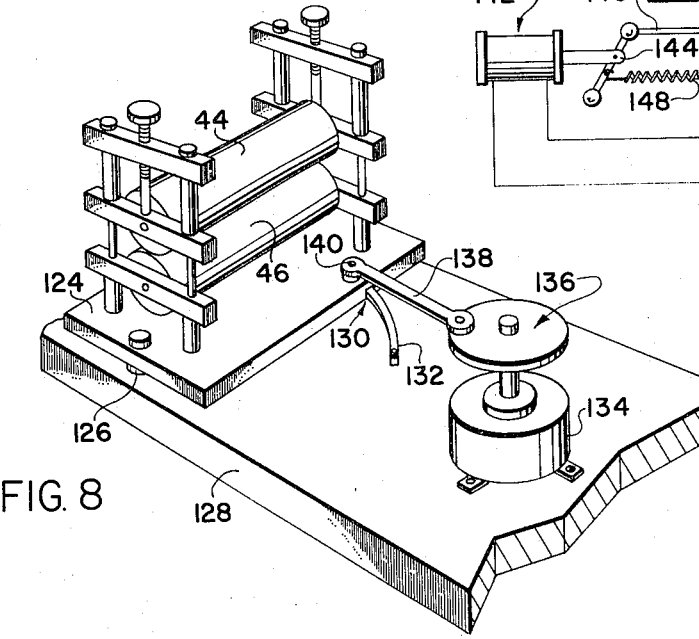
Figure 9:
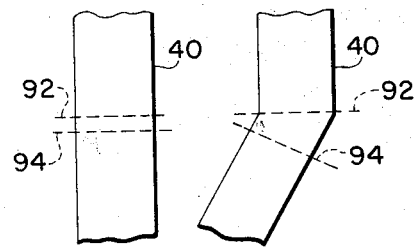
FIG. 9 is a fragmentary plan view of film material undergoing tensioning treatment.

A modification of means for continuously varying the direction of molecular orientation of the film material 40 is shown in FIG. 8. Broadly, it comprises means for providing an automatic and continuous angular movement of the axes of the output pressure rolls 44 and 46 with respect to the axes of the input rolls 30 and 38. Such a movement provides variations of molecular orientation within the film material 40 which are comparable to those above described relative to the apparatus of FIGS. 1, 2, 6 and 7. To achieve the aforesaid angular movement, the output pressure rolls 44 and 46 are mounted on a carriage 124. The carriage is pivotally mounted at one end by bearing means 126 on a fixed frame portion 128 of the apparatus and, at its other end, includes bearing at 130, e.g., roller bearings, which ride upon the curved track 132, associated with the frame 128. Pivotal movement of the carriage and output pressure rolls mounted thereon is effected by the motor 134, the eccentric 136 and the link 138 which is pivotally connected at 140 to the carriage 124. Operation of the device of FIG. 8 is illustrated in FIG. 9 by the two maximum dispositions of the dotted line 94 representing the output compression band, it being understood that the take-up means is automatically moved laterally by suitable linkage in conformance with the alterations in direction of output advancement.

Figure 10:
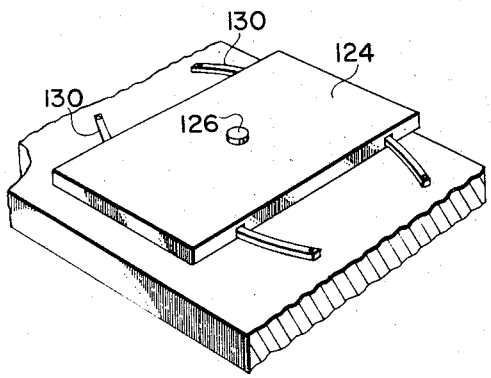
FIG. 10 is a diagrammatic perspective view of a modification of the apparatus of FIG. 8.
Figure 11:
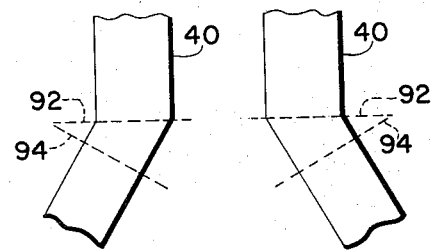
FIG. 11 is another fragmentary plan view of film material undergoing tensioning treatment.
Figure 12:
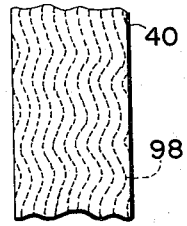
FIG. 12 is a fragmentary plan view of a film material embodying a modified molecular orientation.

A modification of the mounting of carriage 124 is shown in FIG. 10, the carriage being centrally pivoted at 126 and riding on the pair of tracks 130. The maximum acutely angled directions of the output compression band are shown in FIG. 11. The molecular orientation 98a thus obtained is shown in FIG. 12.

Figure 13:
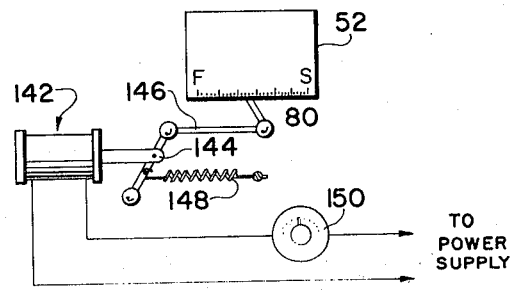
FIG. 13 is a diagrammatic view of another modification of a film tensioning element.

An alternative means for actuating the variable speed device 52 of FIG. 2 is shown in FIG. 13. It comprises a solenoid 142, the armature 144 of which is connected to the lever 80 by a link 146. The armature may include damping means, not shown, and is biased to the location illustrated by the extension spring 148. Automatic intermittent switching or timing means 150 provides alternate energization and de-energization of the solenoid coil and movement of the lever 80 between the F and S positions. A pattern of molecular orientation within the film material 40 similar to that of FIG. 4 but, if desired, of a more abrupt nature may be achieved by a constant making and breaking operation of the means 150. Other and more variegated configurations of molecular orientation may be obtained by a more complex operation provided by a modified means 150 as, for example, by a programmed type of control means or a programmed input introduced thereto providing energizing pulses to the solenoid of differential value and duration. If additional softening of the film material 40 is required, prior to differential applications of tension thereto, it may be treated with a softening solution or subjected to an expanded zone of heat application. While the input angle could conceivably be varied in an automatic and continuous manner to vary the molecular orientation of the film material, obviously, it would constitute a less preferred method because of the mechanical complexity involved.

It is also contemplated that other continuously or intermittently variable orienting forces may be applied to the film material either during its advancement or at a stationary stage to achieve patterns of molecular or crystallographic orientation therewithin of a nature related to those previously described. Thus, for example, differential application of an electrical, electrostatic or electromagnetic force at or adjacent to the softening zone through the medium of electrodes or electromagnets located adjacent to the film material, e.g., adjacent to its edges or marginal area, and having associated predeterminedly variable electrical power supply means may serve such a purpose, and constitute modifications of the methods described herein. Another method contemplates differential applications of heat, as by an infrared beam of controlled differential intensity at the heating zone.

Film materials of optically anisotropic properties and possessing patterns of molecular orientation of the character described herein or of a related nature may be employed for various purposes. When viewed in axially changing polarized light, the configurations of FIGS. 4 and 10 are adapted to produce effects of motion or animation suitable for many display purposes. They may thus be used at their full widths, or they may be cut, longitudinally, into narrow strips or ribbons for the purpose. A plastic film material having a given varying molecular orientation may also be characterized by areas of predetermined strength or weakness which, under stress, may be employed to resist or facilitate tear or rupture. Another contemplated film material is one containing stored information in terms of a plurality of molecular orientations. Such a material may be employed for controlling the transmission of polarized light. Panels of the type of FIGS. 4 and 10, if light polarizing and used with a superimposed quarter-wave retardation panel of similar configuration, provide circularly polarized light of unique orientation characteristics. Again, the patterns of FIGS. 4 and 10, when embodied in coacting pairs of superimposed panels, would provide varying degrees of transmission or absorption of incident light and serve either to transmit polarized light or to partially or entirely block its passage. Other contemplated uses of molecularly oriented areas of the character described lie in the decorative arts.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. A method of providing a given pattern of varying molecular orientation in a deformable plastic film material, comprising the steps of advancing longitudinally a continuous length of said film material in a given direction and at a given rate, applying a compressive gripping force across said material in a narrow band-like area while maintaining its direction and rate of advancement, softening said film material at a location adjacent to said band-like area of compression, advancing said film material longitudinally immediately from said softening location in at least one direction and at a plurality of rates which are different, respectively, from said given direction and said given rate so as to apply a plurality of given differential constantly-varying tensioning forces thereto in a given sequence, thereby providing said pattern of varying molecular orientation.

2. A method, as defined in claim 1, wherein said plurality of differential tensioning forces is provided by repeatedly increasing and decreasing the rate of advancing said film material from said softening location in a predetermined sequence.

3. A method, as defined in claim 2, wherein said rate of advancing said film material from said softening location varies progressively from a rate similar to the rate of advancement previous to softening said film material to a rate appreciably exceeding said last-named rate.

4. A method, as defined in claim 1, wherein said plurality of differential tensioning forces is provided by repeatedly varying said second-named direction of advancing said film material in a predetermined sequence.

5. An apparatus for sequentially applying a plurality of tensioning forces to a plastic sheet material to provide a given pattern of differential molecular orientation therein, said apparatus comprising means for supplying a continuous length of said sheet material, means for advancing said sheet material in a given direction and at a given rate between a first pair of transversely disposed compressive surfaces, means for advancing said sheet material in at least one direction and at least one rate which are different from said given direction and rate between a second pair of transversely disposed compressive surfaces located closely adjacent to said first pair of compressive surfaces, means for applying heat to said sheet material for softening said material in a zone lying between said pairs of compressive surfaces, and means for repetitively varying said different direction of advancement of said sheet material.

6. An apparatus for sequentially applying a plurality of tensioning forces to a plastic sheet material to provide a given pattern of differential molecular orientation therein, said apparatus comprising means for supplying a continuous length of said sheet material, means for advancing said sheet material in a given direction between a first pair of transversely disposed compressive surfaces, means for advancing said sheet material in at least one direction and at least one rate which are different from said given direction and rate between a second pair of transversely disposed compressive surfaces located closely adjacent to said first pair of compressive surfaces, means for applying heat to said sheet material in a zone lying between said pairs of compressive surfaces, and means for repetitively varying the rate of advancing said sheet material in said different direction.

7. An apparatus, as defined in claim 6, wherein said means for varying the rate of advancing said sheet material in said different direction is automatically operative.

References Cited

UNITED STATES PATENTS

| | | | |
|---|---|---|---|
| 2,505,146 | 4/1950 | Ryan | 264—2 |
| 3,078,504 | 2/1963 | Koppehele | 264—289 |
| 3,235,631 | 2/1966 | Shelanski | 264—2 |

ALEXANDER H. BRODMERKEL, *Primary Examiner.*

DONALD J. ARNOLD, *Examiner.*

B. SNYDER, A. H. KOECKERT, *Assistant Examiners.*